United States Patent [19]

Nishioka

[11] 4,453,312
[45] Jun. 12, 1984

[54] SAW ALIGNING MECHANISM FOR POWER HAND SAWS

[76] Inventor: Jim Z. Nishioka, 1268 Hemlock NW., Salem, Oreg. 97304

[21] Appl. No.: 402,238

[22] Filed: Jul. 27, 1982

[51] Int. Cl.³ .............................................. B27B 9/04
[52] U.S. Cl. ....................................... 30/372; 83/745
[58] Field of Search ................. 30/371, 372, 373, 374; 83/745

[56] References Cited

U.S. PATENT DOCUMENTS

| | | | |
|---|---|---|---|
| 2,735,455 | 2/1956 | Forsberg | 83/745 |
| 2,942,633 | 6/1960 | King | 83/745 |
| 2,973,576 | 3/1961 | Henfke | 30/371 X |
| 3,903,774 | 9/1975 | Stinson | 83/745 |
| 4,125,942 | 11/1978 | Horner | 83/745 |
| 4,202,233 | 5/1980 | Larson | 83/745 |

Primary Examiner—Jimmy C. Peters

[57] ABSTRACT

A saw aligning mechanism or assembly in the preferred structure of this disclosure is supported on a power hand saw by a support. The saw comprises a motor, a handle, a blade and a trigger switch. The assembly comprises the support, an elongated shaft and an aligning device or plate. The shaft extends longitudinally in substantially the same direction as the cutting movements of the saw and is connected to the support. The aligning plate extends substantially transversely to the shaft for butting against an object to be cut. The aligning plate is connected to the shaft by a bore which allows the aligning plate to slide and pivot on the shaft. A second form of the disclosure presents an assembly wherein the elongated shaft is slidably connected to the support.

3 Claims, 5 Drawing Figures

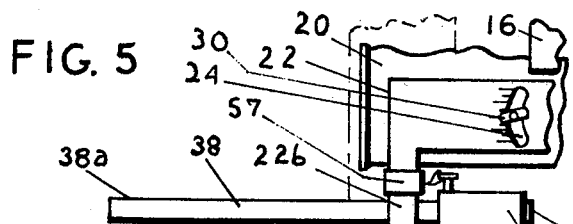
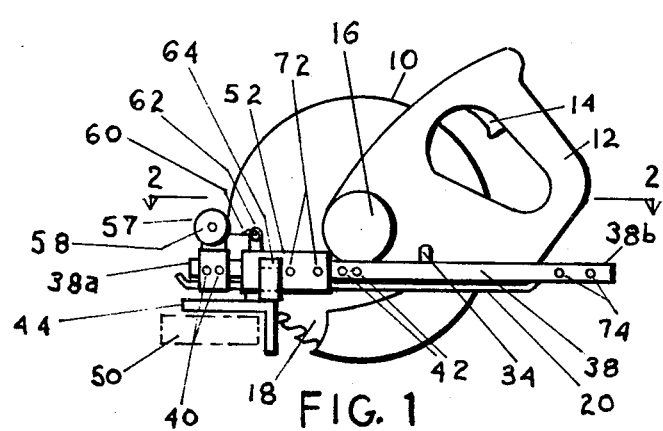
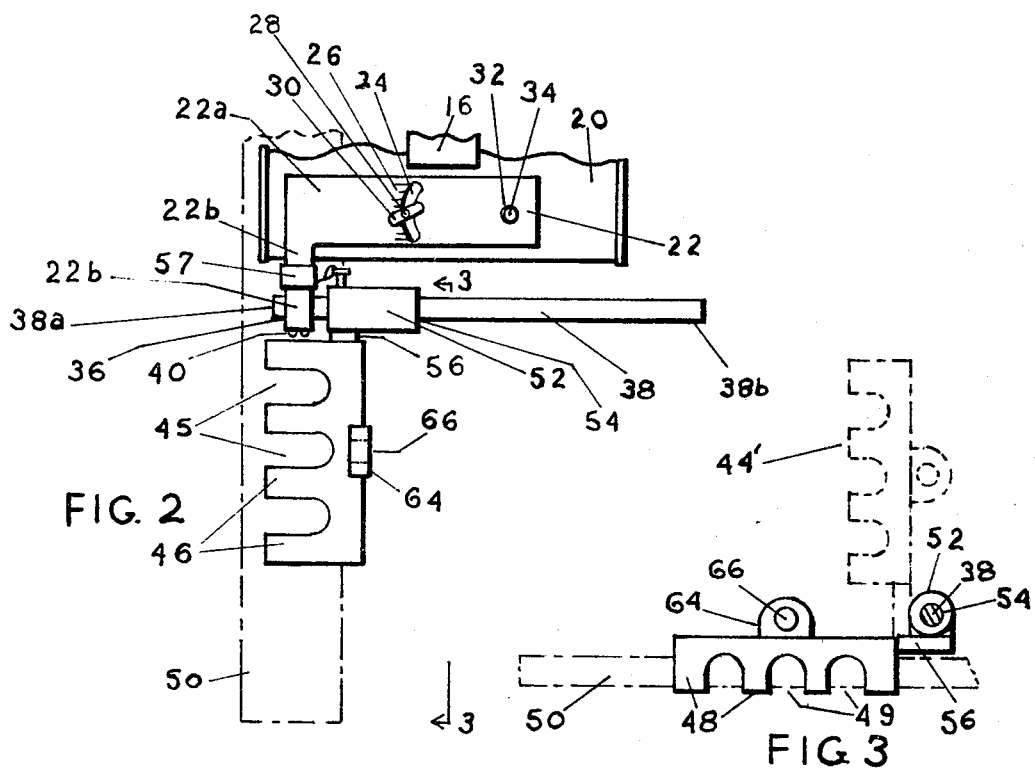
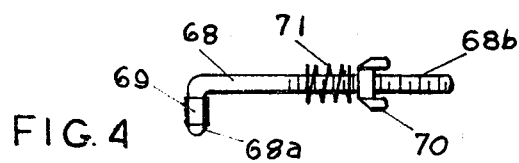

SAW ALIGNING MECHANISM FOR POWER HAND SAWS

FIELD OF THE INVENTION

This invention relates to new and useful improvements in saw aligning mechanism or assemblies for power hand saws.

SUMMARY OF THE INVENTION

According to the present invention and forming primary objectives thereof, a saw aligning assembly for power hand saws is provided having a novel structural arrangement of a support, an elongated guide and an aligning device, the latter for butting against an object to be cut.

In carrying out the invention an assembly is supported on a power hand saw by a support. An elongated guide shaft is connected to the support and extends longitudinally in substantially the same direction as a cutting motion of the saw. An aligning device for butting against an object to be cut is slidably connected to the guide shaft.

An important feature of the present invention is that it employs only one shaft to accomplish the guiding movements. Most structures presently on the market employ two shafts, thus the present invention provides a simplification of design, reduction of parts for a cost savings, and a reduction in weight.

A further advantage is that the assembly employs a simple aligning device which can be manually held against the object to be cut.

A clamping structure which includes an optional spring is also provided with the present invention.

Another advantage is that the invention will function without special tables or stands.

The present invention also has the advantage over an unguided saw in that the operator need only to mark the correct length on the edge of the object to be cut, align the blade to the mark, butt the aligning device against the object and then make the cut. The saw will be guided by the assembly for accuracy. This eliminates the need to scribe a cutting line across the object.

BRIEF DESCRIPTION OF THE DRAWINGS

FIG. 1 is a side elevational view of a saw aligning assembly and a power hand saw embodying the principles of the present invention;

FIG. 2 is a fragmentary top plan view of an aligning assembly taken on lines 2—2 of FIG. 1;

FIG. 3 is a fragmentary view of an aligning device taken on lines 3—3 of FIG. 2;

FIG. 4 is a side elevational view of a clamp of the present invention; and

FIG. 5 is a fragmentary top plan view of an aligning assembly similar to that shown in FIG. 2.

DETAILED DESCRIPTION OF PREFERRED EMBODIMENTS

With reference to first to FIGS. 1-4, the present invention is arranged for use with a power hand saw having a blade guard 10, a handle 12, a trigger switch 14, a motor 16, a blade 18, and a base plate 20.

The saw aligning mechanism or assembly of this preferred structure comprises a support or connecting means 22, an arcuate slot 24, adjusting marks or calibrations 26, a threaded stud 28, a wing nut 30, a bore 32 and a stud 34. Support 22 includes a flat plate portion 22a and an arm portion 22b with a bore 36 extending through the arm portion 22b.

A guide shaft 38 extends longitudinally in substantially same direction as a cutting motion of the saw. The forward portion 38a of the guide shaft is secured in bore 36 by pins 40 through a pair of bores which extend through the arm portion 22b of the support 22 and the shaft 38. The guide shaft 38 includes a rearward portion 38b. The shaft can be selectively positioned in the bore 36 by a second pair of bores 42 to receive pins 40.

An aligning device 44 extends substantially transversely to the shaft 38 and is positioned laterally to one side of the support 22 and the saw. The device includes forwardly extending projections 46 and downwardly extending projections 48, the projections being joined together to form a right angle shape. The object to be cut or work piece is represented by broken lines 50. The projections 46 and 48 butt against the object 50. Slots 45 and 49 between the projections 46 and 48 respectively provide access to grip the object.

The shaft 38 is positioned between the aligning device 44 and the support 44 and the saw.

The aligning device 44 is connected to an engaging member 52 which includes a bore 54 which slidably receives shaft 38. The engaging member is connected to the aligning device by connecting arm 56. The bore 54 allows the aligning device 44 to slide on shaft 38 to allow movement of the saw. The bore 54 also allows the aligning device to pivot or swing vertically to provide for easy handling and storage. The raised or non-use position of the aligning device is shown by the broken lines 44'. The aligning device can be easily removed by sliding it rearwardly off the unobstructed rearward shaft portion 38b.

A resilient return structure 57 is provided and comprises a spring loaded spool 58 secured to the arm portion 22b of the support 22. One end of the cord 60 is connected to the spool 58 and the opposing end is anchored to a stud 62 which is positioned on engaging member 52.

An optional clamping structure is also provided and includes an extension 64 on aligning device 44 with a bore 66 extending through the extension. A L-shaped clamp 68 includes a downwardly turned portion 68a, a threaded portion 68b, and a resilient padding 69 on the turned portion 68a. The padding assists in gripping the object to be cut. A winged nut 70 provides adjustable tension and a spring 71 is also provided to maintain a tension on the object. To use this clamp, simply remove the wing nut 70 and spring 71, insert the clamp 68 in bore 66 and then reinstall the spring and the wing nut. The padded portion 69 of the turned portion 68a of the clamp will then bear against the object 50 and force the object to butt against the downwardly extending projections 48 of the aligning device 44. The clamp may be positioned by simply urging it forwardly against the resistance of the spring 71 and then turning it so that the turned portion 68a is pointed downwardly. Furthermore, the spring 71 may be of such resistance that it will hold the clamp in place without the operator gripping the aligning device 44. The slots 45 on the aligning device 44 allow the clamp to be gripped against objects of narrow dimensions.

Referring to FIG. 5 the embodiment shown is similar to that of FIG. 2 except that the pins 40 have been relocated to bores 72 on guide member 52 and bores 74 on the rearward portion of shaft 38. This connects the shaft 38 and aligning device together so that they will move in unison. The shaft 38 is now free to slide or pivot in bore 36 of the support arm 22b.

To operate the preferred structure shown in FIGS. 1-4: the object to be cut is first marked; the saw blade is positioned relative to the mark; the aligning device 44 is butted against the object 50; and then the cut is made. As the saw moves forwardly through the object the support 22 and the elongated shaft 38 move together in unison while the aligning device 44 and the engaging member 52 remain substantially stationary. The aligning device 44 may be manually butted against the object 50 for fast alignment. However, the clamping structure may be employed if so desired.

Adjusting the angle of the cut is accomplished by loosening wing nut 30, pivoting support 22 on stud 34 and then re-tightening the wing nut. When making angled cuts the elongated guide shaft 38 may not extend exactly in the direction of a cutting motion of the saw, however, it will extend substantially in the same direction.

During forward cutting movements of the saw, tension in the resilient return structure 57 increases as cord 60 reels off the spring loaded spool 58. When the cut is completed and the aligning device 44 clears the object 50, the tension in the cord 60 will urge the alignment device 44 back to its normal position.

In the preferred constructions the shaft 38 and bores 36 and 54 are employed to accomplish the sliding connection of the shaft, however, other structures such as a square shfat, dovetail and slot, and the like may be employed to accomplish the same function. Furthermore, the aligning device 44 is shown in the form of a plate with projections, however, rods, screens or the like may be used. Still further, the support is shown including a plate 22a joined to the base plate 20 of the saw, however, the two can be integrated into a single unit or other forms of joining of the assembly and the saw employed within the scope of this invention. Still further, a spring loaded spool 58 and a cord 60 are employed to return the aligning device 44, however, other devices such as a rubber cord, a rubber strap, a spring or the like may be employed to return the aligning device. Also, the bore 66 seen in FIG. 3 may be fitted with a sleeve to extend the width of the bore to more accurately align the clamp 68.

It is to be understood that the forms of my invention herein shown and described are to be taken as preferred examples of the same and that various changes in the shape, size and arrangement of parts may be resorted to without departing from the spirit of my invention, or eht scope of the subjoined claims.

Having thus described my invention, I claim:

1. In combination, a saw comprising a motor, a handle, a blade, a base plate and a trigger switch, and a mechanism for aligning the saw with a work piece to be cut, said mechanism comprising elongated guide means for guiding the saw during its cutting movements, said elongated guide means extending longitudinally in substantially same direction as a cutting motion of the saw, said elongated guide means comprising a forwardly portion and a rearwardly portion, aligning means for butting against a work piece, said aligning means being slidably engaged to said elongated guide means, said aligning means extending substantially transversely to said elongated guide means, said aligning means being slidably positioned only on said forwardly portion of said elongated guide means during an initial cutting motion of the saw, and connecting means connecting said elongated guide means to the saw, said connecting means restricting forward and rearward movements between said elongated guide means and the saw so that during operation of the combination both said elongated guide means and the saw move forwardly together and in unison.

2. The combination of claim 1 wherein said combination also includes means to allow pivoting movement of said aligning means from a use position for butting against a work piece to a raised non-use position.

3. For use with a power hand saw comprising a motor, a handle, a blade, a base plate and a trigger switch, a mechanism, said mechanism for aligning a saw with a work piece to be cut, said mechanism comprising elongated guide means for guiding a saw during its cutting movements, said elongated guide means extending longitudinally in substantially same direction as a cutting motion of a saw, said elongated guide means comprising a forwardly portion and a rearwardly portion, aligning means for butting against a work piece, said aligning means being slidably engaged to said elongated guide means, said aligning means extending substantially transversely to said elongated guide means, said aligning means being slidably positioned only on said forwardly portion of said elongated guide means during an initial cutting motion of a saw, and connecting means for connecting said elongated guide means to saw, said connecting means engaging said elongated guide means with a non-sliding connection for restricting forward and rearward movements between said elongated guide means and a saw so that during operation of the mechanism said elongated guide means moves forwardly while said aligning means remains with a work piece.

* * * * *